US012711217B2

(12) United States Patent
Saito et al.

(10) Patent No.: US 12,711,217 B2
(45) Date of Patent: Aug. 18, 2026

(54) AUTHENTICATION SYSTEM AND METHOD

(71) Applicant: CANON KABUSHIKI KAISHA, Tokyo (JP)

(72) Inventors: Hiroshi Saito, Kanagawa (JP); Yuichiro Miyauchi, Kanagawa (JP); Takahisa Ono, Kanagawa (JP); Takeshi Kondoh, Tokyo (JP); Masaru Sugita, Tokyo (JP); Masanori Seki, Kanagawa (JP); Ryuichi Otsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 82 days.

(21) Appl. No.: 18/176,994

(22) Filed: Mar. 1, 2023

(65) Prior Publication Data

US 2023/0281293 A1 Sep. 7, 2023

(30) Foreign Application Priority Data

Mar. 4, 2022 (JP) ................................ 2022-033444
Feb. 3, 2023 (JP) ................................ 2023-015334

(51) Int. Cl.
*G06F 21/44* (2013.01)

(52) U.S. Cl.
CPC .................................... *G06F 21/44* (2013.01)

(58) Field of Classification Search
CPC ....................................................... G06F 21/44
See application file for complete search history.

(56) References Cited

U.S. PATENT DOCUMENTS 8,519,360 B2 8/2013 Schoening et al.
9,251,634 B1 * 2/2016 Fraser ................... H04L 9/3247
2006/0016879 A1 * 1/2006 Kean .................... G06Q 20/341 235/492
2012/0068971 A1 * 3/2012 Pemberton-Pigott ........................ G06F 3/0416 345/175
2017/0336373 A1 11/2017 Kang et al.
2018/0024011 A1 1/2018 Patel
(Continued)

FOREIGN PATENT DOCUMENTS

CN 1997097 A 7/2007
CN 104854597 A 8/2015
(Continued)

*Primary Examiner* — Andrew Suh
(74) *Attorney, Agent, or Firm* — Canon U.S.A., Inc. IP Division

(57) ABSTRACT

An authentication system using an information encoding article that includes an information code, the authentication system includes a detection unit capable of reading the information code, an information acquisition unit configured to acquire first information regarding a concentration distribution in an encoding region before and after the application of an external stimulus, and an authentication unit configured to execute authentication by using at least both second information acquired prior to the first information and regarding the concentration distribution in the encoding region and the first information, wherein the information encoding article having the encoding region where the information code is formed, the concentration distribution in the encoding region, to be read by the detection unit, changing upon application of the external stimulus to the encoding region.

5 Claims, 5 Drawing Sheets

(56) References Cited

U.S. PATENT DOCUMENTS

| | | | |
|---|---|---|---|
| 2021/0085811 | A1 | 3/2021 | Gordon |
| 2021/0161355 | A1 | 6/2021 | Rahn et al. |

FOREIGN PATENT DOCUMENTS

| | | | | | |
|---|---|---|---|---|---|
| CN | 114650760 | A | | 6/2022 | |
| JP | 2005049705 | A | * | 2/2005 | ........... G02B 6/1225 |
| JP | 2010220970 | A | | 10/2010 | |
| JP | 2013138189 | A | * | 7/2013 | ........... H01L 21/265 |
| JP | 2021032648 | A | * | 3/2021 | |
| WO | 2015193664 | A1 | | 12/2015 | |

* cited by examiner

Figure 1:
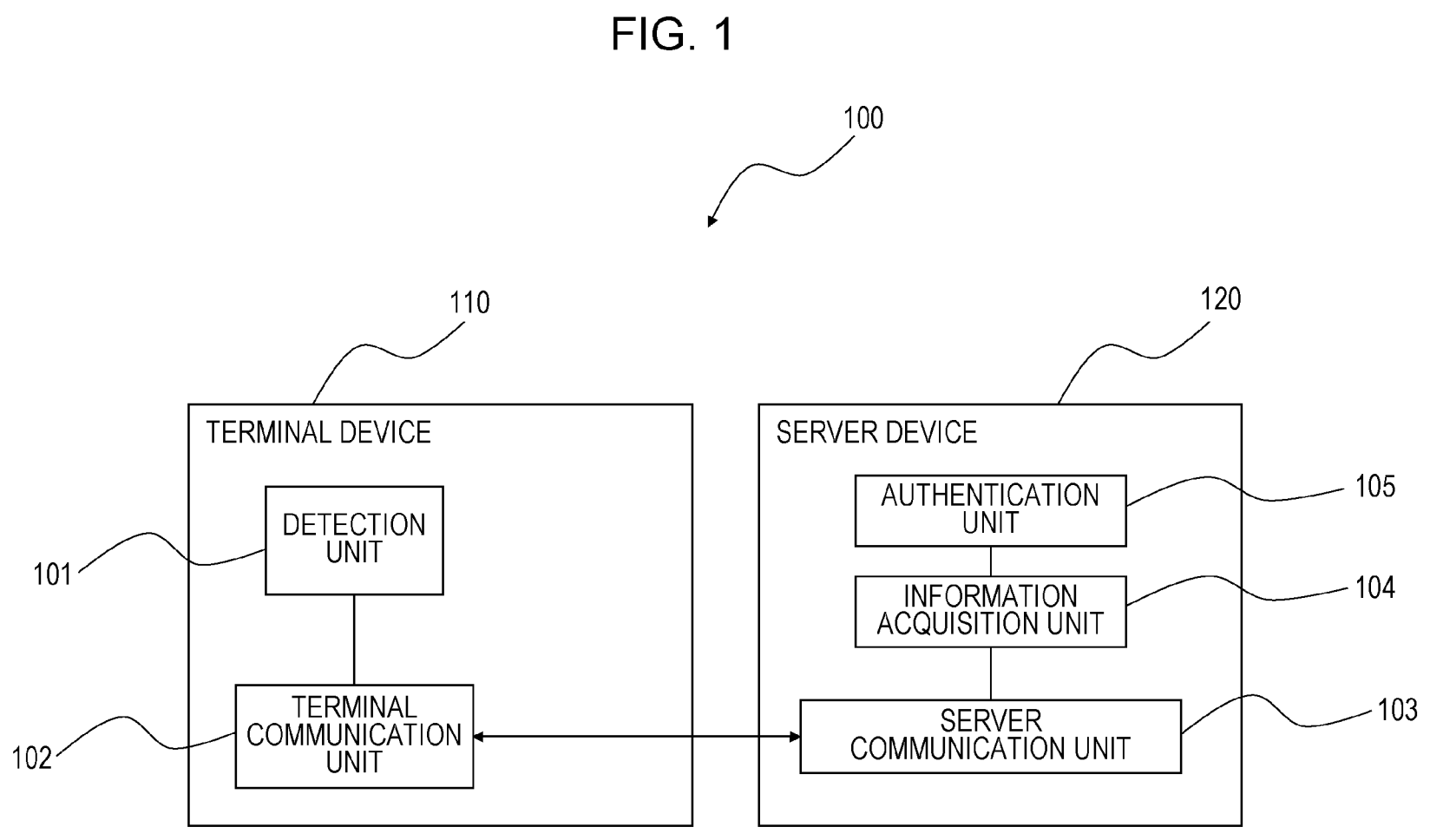

SERVER DEVICE

105

AUTHENTICATION UNIT

104

INFORMATION ACQUISITION UNIT

103

SERVER COMMUNICATION UNIT

110

TERMINAL DEVICE

DETECTION UNIT

101

TERMINAL COMMUNICATION UNIT

102

120
SERVER DEVICE
110
TERMINAL DEVICE
301
COMMUNICATION UNIT
302
STORAGE UNIT
303
OPERATING UNIT
304
DISPLAY UNIT
305
ROM
306
RAM
310
CONTROL UNIT
307
DATA RECORDING AND UPDATING UNIT
308
DATA PROCESSING UNIT

4 / 5

401
402
403

404
401
402
403

410
404
405

402
405

AUTHENTICATION SYSTEM AND METHOD

BACKGROUND

Field

The present disclosure relates to an authentication system and an authentication method.

Description of the Related Art

With importance paid to operation of cleaning and disinfection, techniques of visualizing the operation are disclosed. In the specification of U.S. Pat. No. 8,519,360, the disinfection operation in the cleaning is visualized by using a fluorescent material in an ultraviolet range. The specification of U.S. Patent Application Publication No. 2017/0336373 discloses a technique of changing the developed color of a pH responsive dye by utilizing a reaction between a disinfectant and the pH responsive dye.

Those specifications of U.S. Pat. No. 8,519,360 and U.S. Patent Application Publication No. 2017/0336373 disclose materials capable of visualizing the application of the disinfectant, but do not disclose how to record or manage application situations of the disinfectant when there are many disinfection targets. If a person records the completion of the application of the disinfectant by handwriting or by inputting data into, for example, a computer when there are many disinfection targets, such work needs time and effort and leads to a possibility that the application situations of the disinfectant may be erroneously recorded.

SUMMARY

As a technique of visualizing the operation of the disinfection, an encoding article on which an information code appears with a change in color developing state caused upon the application of the disinfectant can be used. Such a technique is based on consideration that, if the operation of the disinfection can be visualized by reading the information code, errors can be reduced in comparison with the case of manual work.

However, the above-mentioned technique accompanies a possibility of fraudulent use, because the information code can be copied by a camera, a copying machine, or the like.

The present disclosure provides a system of reducing the fraudulent use in the technique of visualizing the operation of the disinfection with use of the information code. The present disclosure provides An authentication system using an information encoding article that includes an information code, the authentication system includes a detection unit capable of reading the information code, an information acquisition unit configured to acquire first information regarding a concentration distribution in an encoding region before and after the application of an external stimulus, and an authentication unit configured to execute authentication by using at least both second information acquired prior to the first information and regarding the concentration distribution in the encoding region and the first information, wherein the information encoding article having the encoding region where the information code is formed, the concentration distribution in the encoding region, to be read by the detection unit, changing upon application of the external stimulus to the encoding region.

The present disclosure provides an authentication method using an information encoding article that includes an information code, the authentication method includes reading a concentration distribution in an encoding region upon application of an external stimulus, acquiring first information regarding the concentration distribution in the encoding region before and after the application of the external stimulus, and executing authentication by using at least both second information acquired prior to the first information and regarding the concentration distribution in the encoding region and the first information, wherein the information encoding article having the encoding region where the information is formed.

Further features of various embodiments will become apparent from the following description of exemplary embodiments with reference to the attached drawings.

BRIEF DESCRIPTION OF THE DRAWINGS

FIG. 1 is a block diagram to explain a system according to a first embodiment of the present disclosure.

DESCRIPTION OF THE EMBODIMENTS

Figure 2:
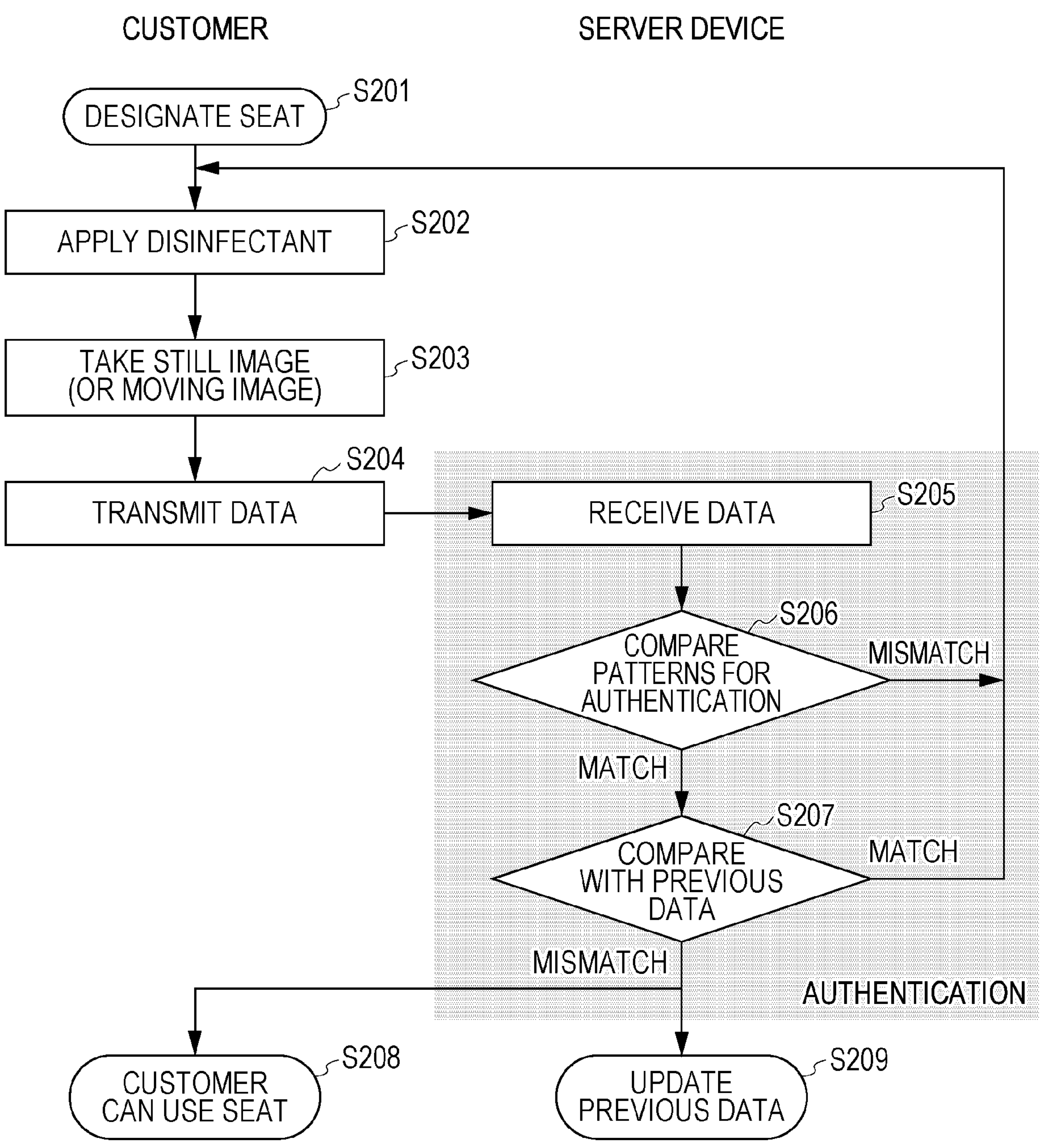
FIG. 2 is a flowchart to explain a method according to the first embodiment of the present disclosure.

Embodiments of the present disclosure will be described below, but the present disclosure is not limited to the following embodiments.

System

A system 100 according to an embodiment is an authentication system using an information encoding article that includes an information code capable of being read by a detection unit 101. The information encoding article has an encoding region where the information code is formed. A concentration distribution in the encoding region, to be read by the detection unit 101, changes upon application of an external stimulus to the encoding region. The system 100 includes an information acquisition unit 104 configured to acquire first information regarding concentration distributions in the encoding region before and after the application of the external stimulus, and an authentication unit 105 configured to execute authentication by using at least both second information acquired prior to the first information and regarding the concentration distribution in the encoding region and the first information. Here, the term "concentration distribution" indicates how the concentration is two- or three-dimensionally distributed in, for example, a design, a figure, or a pattern represented by the information code. The term "external stimulus" typically indicates application of a disinfectant but includes chemical reactions other than that caused by the application of the disinfectant, heating due to wiping on furniture, application of an external force, and so on. The following description is made in connection with an example in which the external stimulus is the application of the disinfectant. While the information acquisition unit 104 is included in a server device 120 in FIG. 1, it may be included in a terminal device 110. In the latter case, the information acquisition unit 104 can be disposed between the detection unit 101 and a terminal communication unit 102.

Thus, in this embodiment, a change in the concentration distribution in the encoding region forming the information code between before and after the application of the disinfectant is detected and compared with a previous change or a reference change. If a degree of correlation between both the changes is above a predetermined value, it is determined that there is fraud. Usually, changes caused by the application of the external stimulus are not the same between previous time and this time, and a certain difference generates. If both the changes are the same, it can be determined that information regarding those changes is fraudulently acquired.

The authentication unit 105 in this embodiment can execute the authentication based on the degree of correlation between the first information and the second information.

The first information and the second information may be each a time-dependent change in the concentration distribution in the encoding region. In more detail, the time-dependent change in the concentration distribution in the encoding region, represented by the first information, and the time-dependent change in the concentration distribution in the encoding region, represented by the second information, are compared with each other, or a degree of correlation therebetween is calculated. If both the time-dependent changes match or can be regarded as matching, this is determined as indicating fraud. The reason is that the second information is acquired before acquiring the first information and there should be a difference between both the changes in the concentration distribution. If the first information and the second information match or can be regarded as matching, it can be determined that the acquired first information has been fraudulently acquired.

The first information and the second information may be each a spatial concentration distribution in the encoding region. In more detail, the first information representing the spatial (two- or three-dimensional) concentration distribution in the information code, obtained after the application of the disinfectant, and the second information representing the spatial concentration distribution in the information code, obtained before acquiring the first information, may be compared with each other, or a degree of correlation therebetween may be calculated. In this case as well, if both the concentration distributions match or can be regarded as matching, it can be determined that the first information used in the above case has been fraudulently acquired.

A storage unit in this embodiment may be a memory such as a ROM or a RAM, or a storage medium such as a flexible disk, a hard disk, an optical disk, an opto-magnetic disk, a CD-ROM, a CD-R, a magnetic tape, a nonvolatile memory card, or a DVD.

Disinfectant

The disinfectant in this embodiment is used for the purpose of sanitization, sterilization, disinfection, or the like and may be given as a liquid composition of which color developing state changes upon reaction with a visualization agent. Effective components of the liquid composition may be, for example, a surfactant, a basic component, an acidic component, and alcohol. Examples of the basic component may be alkali, perchloric acid, hypochlorous acid, and sodium salts of the formers. The reaction between the disinfectant and the visualization agent in this embodiment may occur in a liquid or at a solid-liquid interface and may be caused under conditions of normal temperature and pressure, heating, cooling, or application of pressure. The principle of the reaction may be, for example, photochromism, thermochromism, electrochromism, acidichromism, solvatochromism, or vapochromism. The reaction may be reversible or irreversible. The disinfectant used in this embodiment can be made of a weakly acidic material. An organic acid, such as citric acid, malic acid, lactic acid, or succinic acid, or weakly acidic hypochlorous water can be used as the weakly acidic material.

Detection Unit

The system according to this embodiment includes the detection unit capable of reading the information code on the information encoding article. The detection unit 101 may be, for example, a unit of detecting an optical change.

In this embodiment, the unit of detecting the optical change may be, for example, an image capturing unit such as a camera, a video camera, a monitor camera, a terminal, a smartphone, or a tablet, each of the last three having the camera function. A camera (wearable camera or mobile camera) worn by a worker who performs operation of the disinfection can also be used. A typical example of the unit of detecting the optical change is an image information acquisition unit that may capture a still image or a moving image.

When the image information acquisition unit acquires a moving image, it may include a unit of acquiring an image of a disinfected region from the moving image captured during a certain period. To acquire the image of the disinfected region from the moving image, the image information acquisition unit may include a unit of detecting a changing point in the moving image. In that case, from the viewpoint of security, it is preferable not to store images other than the image of the disinfected region.

Terminal Communication Unit and Server Communication Unit

The terminal communication unit and a server communication unit in this embodiment communicate information (data) such as a determination result and so on. Those units may be each, for example, a LAN (Local Area Network) or a WAN (Wide Area Network). The LAN may be a wired LAN or a wireless LAN. The terminal communication unit is implemented as, for example, a wireless communication module and executes communication with the server communication unit or a communication network. The above point is similarly applied to the server communication unit as well.

Terminal Device

An example of the terminal device 110 in this embodiment includes the detection unit 101 and the terminal communication unit 102 (FIG. 1). The terminal device in this embodiment may be a terminal dedicated for determining the operation of the disinfection or a universal smartphone or tablet.

Server Device

The server device 120 in this embodiment has the function of not only communicating information (data) with the terminal device in the disinfected region, but also storing and analyzing the information (for example, executing comparison and authentication of the information).

Figure 3:
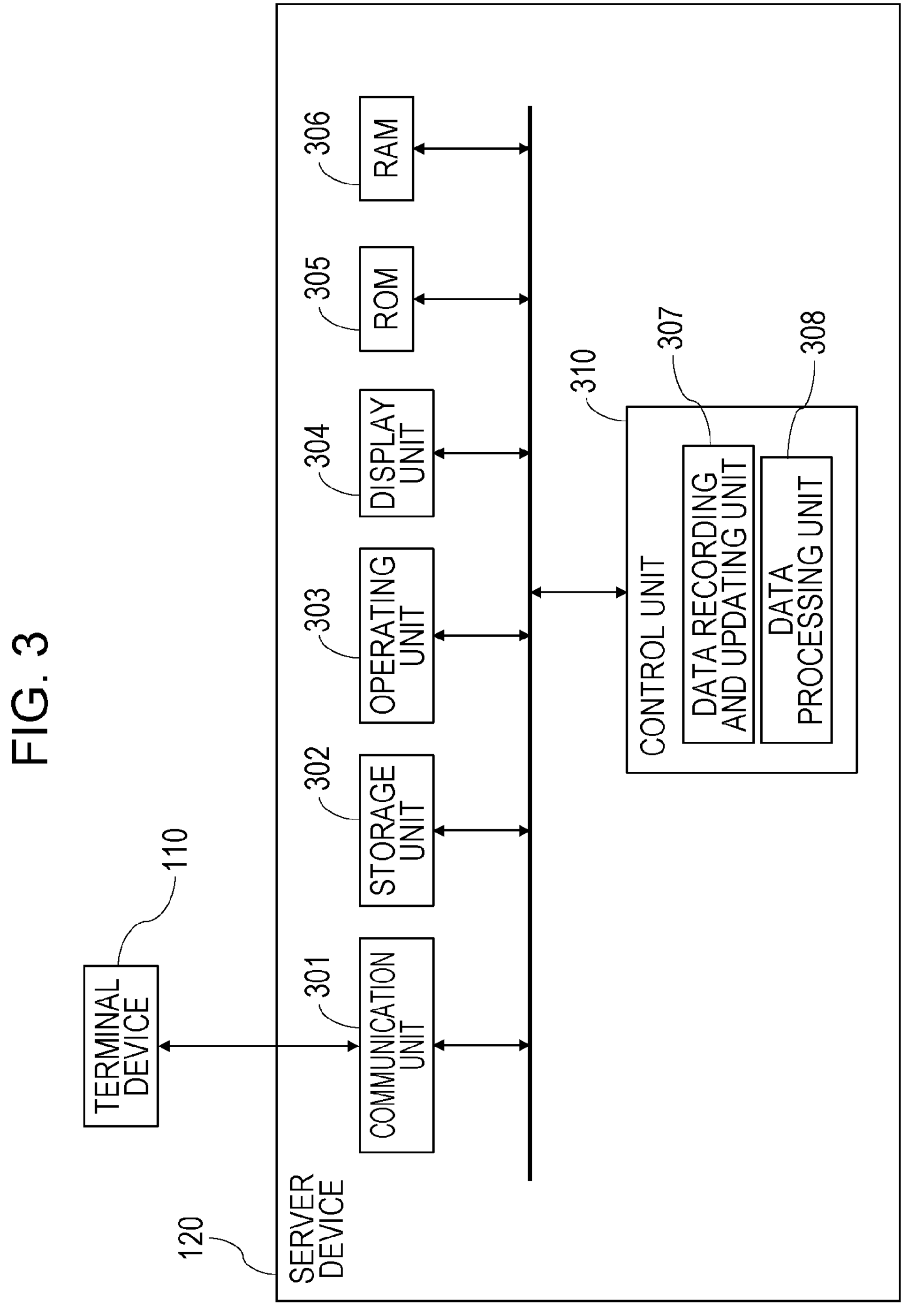
FIG. 3 illustrates an example of a server device in the first embodiment of the present disclosure.

An example of the server device 120 is described with reference to a block diagram of FIG. 3. The server device 120 includes a communication unit 301 (server communication unit 103), a storage unit 302, an operating unit 303, a display unit 304, a ROM 305, a RAM 306, and a control unit 310. The communication unit 301 is implemented as a LAN card or the like and executes communication with an external device (for example, the terminal device 110) or a communication network. The ROM 305 is implemented as a nonvolatile memory or the like and stores various programs and so on. The RAM 306 is implemented as a volatile memory or the like and temporarily stores various kinds of information. The storage unit 302 is implemented as a HDD (Hard Disk Drive), an SSD (Solid State Drive), a NAS (Network Attached Storage), or the like and stores various kinds of information. The operating unit 303 is implemented as a keyboard, a mouse, or the like. The display unit 504 is implemented as a display or the like and displays various kinds of information to a user.

The control unit 310 includes a data recording and updating unit 307 and a data processing unit 308. The data recording and updating unit 307 stores, in the storage unit 302, the ROM 305, or the RAM 306, the information regarding the determination result indicating that the operation of the disinfection has been performed, and regarding the time and the place at which the operation of the disinfection has been performed. The data processing unit 308 executes data processing of the information by, for example, adding information to the information having been read or converting the read information while referring to a database stored in the storage unit 302, the ROM 305, or the RAM 306. A processing result may be communicated to the terminal device 110 by using the communication unit 301.

Authentication Method

Figure 5:
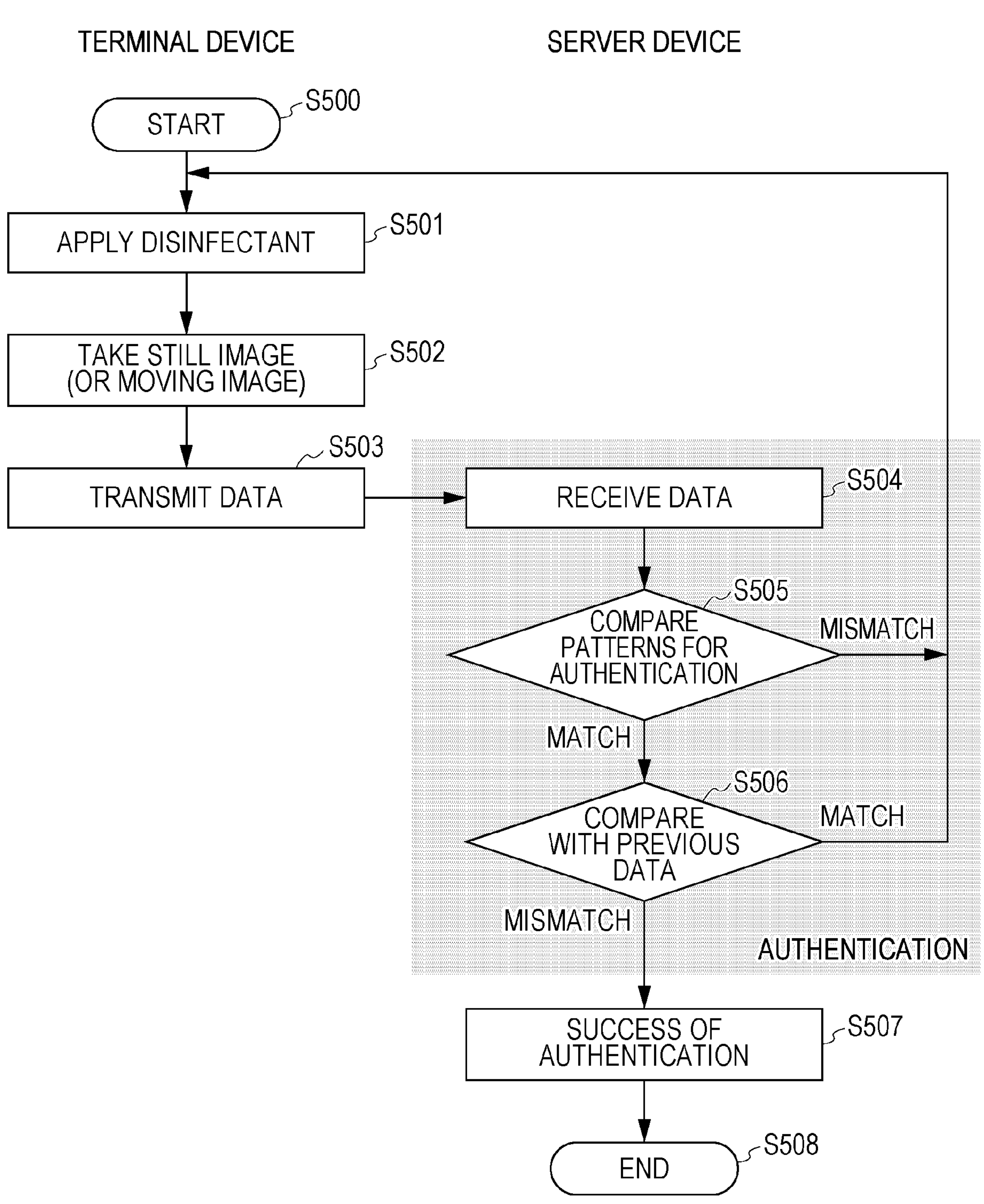
FIG. 5 is a flowchart to explain the method according to the first embodiment of the present disclosure.

Au authentication method in this embodiment is described with reference to FIG. 5. First, when the disinfectant is first applied (S501), a pattern change in the information encoding article is taken as a still image or a moving image (S502). Data of the taken still image or moving image is then transmitted to the server device (S503). The data obtained in S503 includes the first information, and the first information includes the information regarding the concentration distribution in the encoding region forming the information code on the information encoding article. The server device receives the data (S504) transmitted in S503, acquires the first information from the received data, and executes comparison with information having been already acquired (namely, a reference pattern of the information code), specifically comparison of patterns for authentication (S505). In S505, it is first determined whether the information code included in the first information represents a predetermined pattern. Thus, the information code representing the reference pattern and the information code included in the first information are compared with each other, and if both the information codes match, the processing advances to a next step. In the case of mismatch, the processing returns to S500. In S506, the data acquired at this time is compared with data acquired at previous time (namely, previous data). If both the data are not regarded as matching or substantially matching (if they mismatch), success of the authentication is determined (S507). The authentication method according to this embodiment is described in connection with an example in which the authentication system is applied to use of a seat (FIG. 2).

First, a customer designates a seat that the customer wants to use (S201). The disinfectant is applied to the seat, a table, and so on (S202). A pattern change in the information code is taken as a still image or a moving image of the information encoding article (S203), and data of the taken still image or moving image is transmitted to the server device (S204). The data obtained in S203 includes the first information, and the first information includes the information regarding the concentration distribution in the encoding region forming the information code on the information encoding article. The server device receives the data (S205) transmitted in S204, acquires the first information from the received data, and executes comparison with information having been already acquired (namely, the reference pattern of the information code), specifically comparison of patterns for authentication (S206). In S206, it is first determined whether the information code included in the first information represents the predetermined pattern. Thus, the information code representing the reference pattern and the information code included in the first information are compared with each other, and if both the information codes match, the processing advances to a next step. In the case of mismatch, the processing returns to a point before S202. In S207, the data acquired at this time is compared with data acquired at previous time (namely, previous data). If both the data are not regarded as matching or substantially matching (if they mismatch), the customer can use the seat (S208). At that time, the data (previous data) to be used for next authentication may be updated (S209).

First Embodiment

The system according to a first embodiment is described with reference to FIG. 1. This embodiment is described in connection with the case in which the detection unit 101 is a camera capable of reading the information code on the information encoding article in the disinfected region.

In this embodiment, a camera is used as the detection unit 101 to read the information code in the disinfected region. Data including the read first information is transmitted to the server device 120 by using the terminal communication unit. The data is stored in the storage unit 302 in the server device 120.

The above-described data may be similarly stored in the storage unit 302 for each of multiple disinfected regions.

Information Acquisition Unit

The information acquisition unit 104 in this embodiment acquires the first information regarding the concentration distributions in the encoding region before and after the application of the external stimulus. The information acquisition unit 104 is included in, for example, the data processing unit 308 in the control unit of FIG. 3.

Authentication Unit

The authentication unit 105 in this embodiment executes authentication by using at least both the second information acquired prior to the first information and regarding the concentration distribution in the encoding region and the first information. The authentication unit 105 is included in, for example, the data processing unit 308 in the control unit of FIG. 3.

Second Embodiment

In the system according to a second embodiment, a disinfectant visualization sheet is used when the completion of the disinfection operation is determined in the above-described system according to the first embodiment. The disinfectant visualization sheet in this embodiment is visualized with application of the disinfectant to the sheet. The disinfectant visualization sheet will be described in more detail below.

Disinfectant Visualization Sheet

Figures 4A, 4B, 4C, 4D:
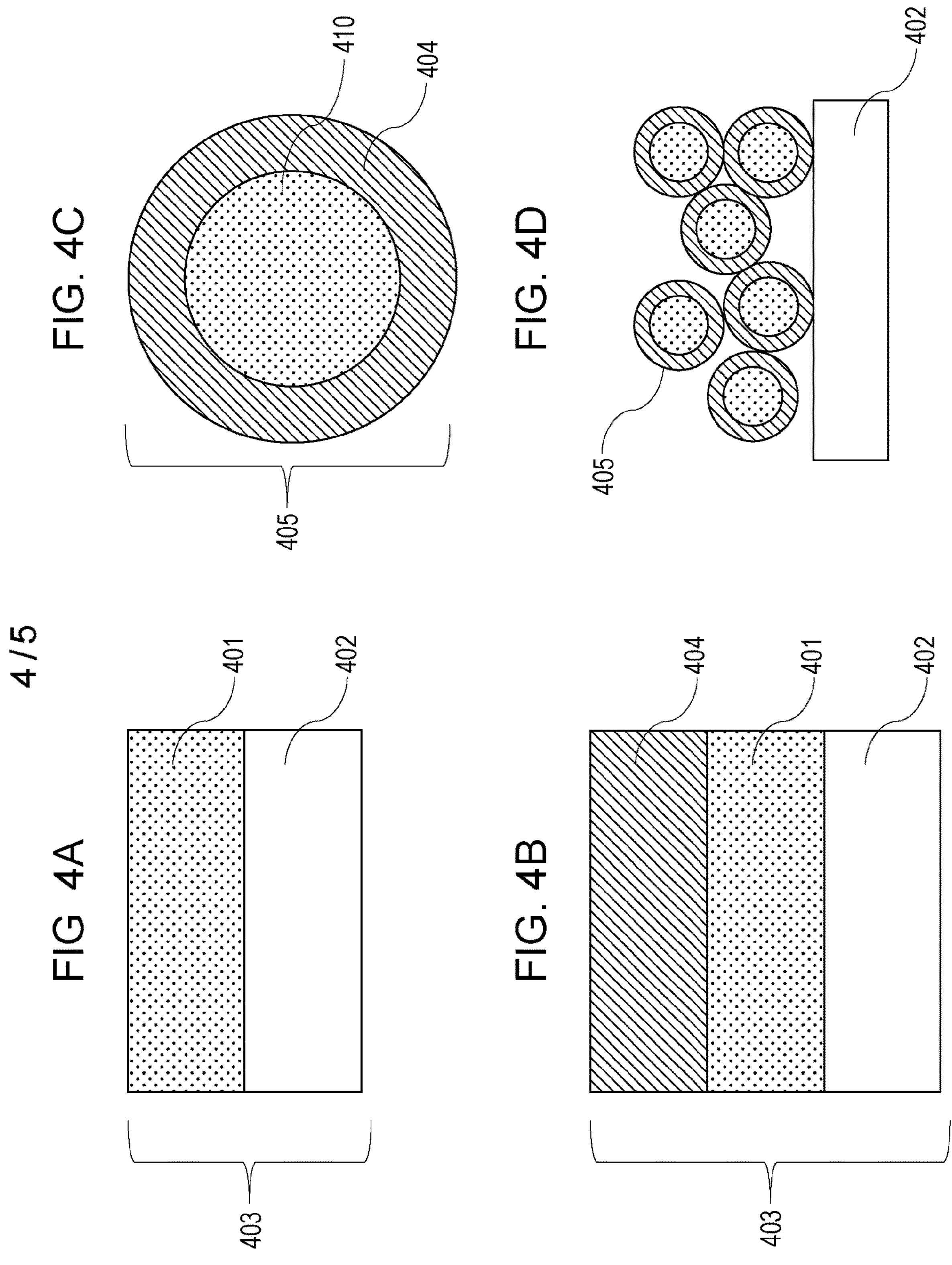
FIGS. 4A, 4B, 4C, and 4D are explanatory views of a disinfectant visualization sheet according to a second embodiment of the present disclosure.

The disinfectant visualization sheet 403 according to this embodiment includes a base 402 and a color developing portion 401 disposed on the base 402 (FIG. 4A). The color developing portion 401 includes the visualization agent (not illustrated) of which color developing state changes with the application of the disinfectant. Using the disinfectant visualization sheet according to this embodiment enables the application of the disinfectant to be simply confirmed by visually checking a change in the color developing state. Furthermore, the disinfectant and the visualization agent are mixed with each other at the time of applying the disinfectant to the disinfectant visualization sheet, and a time during which the disinfectant and the visualization agent are in a mixed state is short. Accordingly, materials used as the disinfectant and the visualization agent are easy to store for a long term. Here, in the application of the disinfectant, the disinfectant just needs to reach the visualization agent. Thus, the disinfectant can be applied by, for example, spraying of the disinfectant or wiping with a duster soaked with the disinfectant.

Color Developing Portion

The color developing portion in this embodiment includes at least the visualization agent. The color developing portion may include a binder to increase adhesion to the base. Resin can be used as the binder. For example, urethane resin or polyvinyl alcohol can be used.

A thickness of the color developing portion is preferably 1 μm or more and 80 μm or less. The thickness is more preferably 5 μm or more and 60 μm or less and particularly preferably 15 μm or more and 50 μm or less. When the thickness of the color developing portion is 80 μm or less, the adhesion to the base is increased. When the thickness of the color developing portion is 1 μm or more, the color developing state in the color developing portion is improved. The color developing portion in this embodiment just needs to be disposed in at least part of the base and may be disposed over an entire surface of the base. The wording "disposed in at least part of the base" indicates the case in which the color developing portion is disposed in, for example, a polka-dot pattern or a checkerboard pattern. When the wiping with the disinfectant is performed, a pattern of the color developing portion may be formed to indicate a start position and an end position of the wiping. Furthermore, when the color developing portion is disposed on the base of a rectangular shape, the color developing portion may be formed in such a pattern that it has a smaller area in a central region than in four corner regions.

Visualization Agent

The visualization agent used in this embodiment is not limited to a particular one insofar as the color developing state of the visualization agent changes upon the reaction with the disinfectant. In this embodiment, the wording "change in the color developing state" indicates such a change as enabling a color difference between before and after the application of the disinfectant to be visually recognized. That change is, for example, any of a change from a visually unrecognizable state to a visually recognizable state, a change from a visually recognizable state to a visually unrecognizable state, and a visually recognizable color change. Here, the visually recognizable color change includes a change in shade of color.

Chromism is known as an example of phenomenon causing the change in the color developing state. The chromism includes, for example, photochromism, thermochromism, electrochromism, acidichromism, solvatochromism, and vapochromism. In this embodiment, substances causing those phenomena are called chromic substances. More specifically, those chromic substances can be called a photochromic substance, a thermochromic substance, an electrochromic substance, an acidichromic substance, a solvatochromic substance, and a vapochromic substance.

The acidichromic substance is a substance of which color changes with a change in pH, and a color developing range is different depending on the properties of individual substances. The acidichromic substance is, for example, at least one selected from the group consisting of Metanil Yellow, Metacresol Purple, Thymol Blue, Tropaeolin O, 2,4-dinitrophenol, Methyl Yellow, Bromophenol Blue, Congo Red, Methyl Orange, Bromochlorophenol Blue, Alizarin Red S, Bromocresol Green, Methyl Orange-Xylene Cyanol FF, 2,5-dinitrophenol, Methyl Orange-Indigo Carmine, Methyl Red, Methyl Orange-Xylene Cyanol FF-phenolphthalein, Lacmoid, Chlorophenol Red, o-nitrophenol, p-nitrophenol, Bromocresol Green-Methyl Red, Bromocresol Purple, Bromophenol Red, Methyl Red-Methylene Blue, Bromothymol Blue, Neutral Red, Phenol Red, Neutral Red-Bromothymol Blue, Cresol Red, α-naphtolphthalein, Bromothymol Blue-Phenol Red, Curcumin, phenolphthalein, Cresol Red-Thymol Blue, o-cresolphthalein, α-naphtolbenzein, thymolphthalein, Thymol Blue-phenolphthalein, Alizarin Yellow GG, Alizarin Yellow R, nitramine, 1,3,5-trinitrobenzene, Indigo Carmine, Methyl Violet, litmus, and Methyl Purple. Colors of some of the above-mentioned examples change in either acidic or alkaline pH range while colors of some other examples, such as Thymol Blue, change in both acidic and alkaline pH ranges. Among the above-mentioned examples, desirable examples because of being low toxic are Metanil Yellow, Metacresol Purple, Thymol Blue, Tropacolin O, Bromophenol Blue, Bromochlorophenol Blue, Alizarin Red S, Bromocresol Green, Methyl Red, Lacmoid, Chlorophenol Red, o-nitrophenol, Bromocresol Purple, Bromophenol Red, Bromothymol Blue, Neutral Red, Phenol Red, Cresol Red, α-naphtolphthalein, phenolphthalein, o-cresolphthalein, thymolphthalein, Alizarin Yellow GG, Alizarin Yellow R, Methyl Violet, litmus, and Methyl Purple. More desirable examples because of causing a color change at pH of 3 or more and 11 or less are Metacresol Purple, Thymol Blue, Tropacolin O, Bromophenol Blue, Bromochlorophenol Blue, Alizarin Red S, Bromocresol Green, Methyl Red, Lacmoid, Chlorophenol Red, o-nitrophenol, Bromocresol Purple, Bromophenol Red, Bromothymol Blue, Neutral Red, Phenol Red, Cresol Red, α-naphtolphthalein, phenolphthalein, o-cresolphthalein, thymolphthalein, Alizarin Yellow GG, Alizarin Yellow R, litmus, and Methyl Purple. It is desirable that the color change occurs in an alkaline range when the disinfectant used is alkaline, and in an acidic range when the disinfectant used is acidic.

The color of the visualization agent changes with vaporization of the disinfectant and the solvent to restore the original one. Here, the word "restore" indicates that the color of the visualization agent returns to the state before the application of the disinfectant. This can also be said that the color developing state is reversible. In other words, the visualization agent used in this embodiment may have the color developing state that changes for a certain time with the application of the disinfectant and then returns to the state before the application of the disinfectant. For example, the color developing state may change to the visually recognizable state with the application of the disinfectant to the visualization agent that is in the visually unrecognizable state, and may return to the visually unrecognizable state after the lapse of a certain time. When the visualization agent is reversible as described above, the visualization agent can be used in a situation in which the disinfection needs to be performed repeatedly.

Two or more types of visualization agents may be used. Using, for example, visualization agents keeping developed colors for different times is desirable in that the visualization agents can serve as indicators indicating the time lapsed after contact with the disinfectant.

The visualization agent may be made of a material responsive to light other than visible light and may be made of a material absorbing light of wavelength in an ultraviolet or infrared range. The ultraviolet or infrared range includes a near-ultraviolet or near-infrared range. In such a case, an observation system for the ultraviolet or infrared range is disposed in the above-described monitor camera. Those materials and observation system can be given by known ones.

Base

The base used in this embodiment may be any type of member insofar as the color developing portion can be disposed on the base.

The base is preferably a resin sheet because the resin sheet is light and flexible. Materials of the resin sheet include, for example, polyester resin such as polyethylene terephthalate, polybutylene terephthalate, or a polyethylene terephthalate/isophthalate copolymer; polyolefin resin such as polyethylene, polypropylene, or polymethylpentene; polyfluoroethylene resin such as polyvinyl fluoride, polyvinylidene fluoride, polytetrafluoroethylene, or an ethylene-tetrafluoroethylene copolymer; aliphatic polyamide resin such as nylon 6 or nylon 6,6; vinyl polymer resin such as polyvinyl chloride, a vinyl chloride/vinyl acetate copolymer, an ethylene/vinyl acetate copolymer, an ethylene/vinyl alcohol copolymer, polyvinyl alcohol, or vinylon; cellulose resin such as cellulose triacetate or cellophane; acrylic resin such as polymethyl methacrylate, polyethyl methacrylate, polyethyl acrylate, or polybutyl acrylate; and other synthetic resins such as polystyrene, polycarbonate, polyarylate, and polyimide. The resin sheet may be used as one type of sheet, or a composite or laminated sheet formed by two or more types of sheets. The base preferably includes an accepting layer to retain the color developing portion. This is because, when the visualization agent is ink, the accepting layer can easily retain the ink.

The accepting layer of the base in this embodiment is desired not to react with the visualization agent. For instance, when the visualization agent develops the color in the alkaline range, the accepting layer is desirably neutral or acidic. If the accepting layer and the visualization agent react with each other, this is undesirable because the visualization agent develops the color before reacting with the disinfectant.

The base in this embodiment may be transparent, opaque, or colored. When the visualization agent has a color before reacting with the disinfectant, the base is desirably colored in a color close to that of the visualization agent.

Release paper, a metal plate, a piece of wood, or the like can be used as the base in this embodiment. The base may further include a bonding portion for bonding of the base to another member. The bonding portion may be disposed over an entire surface of the base or on part of the base surface. When the bonding portion is disposed on part of the base surface, it is easy to peel off. The bonding portion is easier to peel off when it contains UV-curable resin.

When the base is made of paper, the color developing portion may include a surfactant, such as an anionic, cationic, or nonionic surfactant, to make the visualization agent compatible with the paper. Nonionic surfactants, such as polyoxyethylene alkyl ether, polyoxyethylene aliphatic ether, polyoxyethylene alkyl phenyl ether, a polyoxyethylene polyoxypropylene block copolymer, and acetylene glycol compounds, are preferably used as the surfactant.

Retaining Portion

The disinfectant visualization sheet 403 in this embodiment may include a retaining portion 404 to retain the disinfectant on the color developing portion 401 (FIG. 4B). Since the retaining portion 404 enables the disinfectant to be retained for a longer time, it is possible to prolong a time during which the disinfectant is reacting with the visualization agent and developing the color. Furthermore, the color developing time can be controlled by appropriately selecting a material used as the retaining portion 404. For example, a time to change from the visually recognizable color-developed state to the visually unrecognizable state can be controlled.

Because of having the above-described function, the retaining portion can also be said as a color-disappearing time control portion.

The retaining portion desirably includes voids to retain the applied disinfectant. For example, inorganic particles or resin having voids can be used to form the voids in the retaining portion. The inorganic particles used here are at least one selected from the group consisting of pearl-necklace silica particles, chain silica particles, spherical colloidal silica particles, aspherical colloidal silica particles, alumina particles, titania particles, and zirconia particles. A peak position of particle size distribution measured for particle sizes of the inorganic particles in accordance with the dynamic light scattering method is preferably present at 1 nm or more and 300 nm or less. The peak position is more preferably present at 1 nm or more and 150 nm or less and is even preferably present at 1 nm or more and 60 nm or less. Particularly, the peak position of the pearl-necklace silica particles is preferably present at 20 nm or more and 50 nm or less. The peak position of the chain silica particles is preferably present at 1 nm or more and 10 nm or less. If the particle size is too large, this is undesirable because the number of voids reduces. On the other hand, if the particle size is too small, this is undesirable because pore diameters of the voids formed by the inorganic particles become too small and an absorption speed of the applied disinfectant reduces. A distribution curve of the pore diameters preferably has a maximum peak in a range of 5 nm or more and 20 nm or less. If the peak of the distribution curve of the pore diameters is less than 5 nm, the absorption speed of the disinfectant may reduce in some cases. If that peak exceeds 20 nm, haze may increase in some cases. An increase of the haze is undesirable in that whiteness becomes conspicuous and visibility of the color developing portion reduces. The pore diameters can be determined with the BET specific area measurement.

The resin used here can be selected from various types of resins. However, when the disinfectant is aqueous, water-soluble resin is preferably used. The water-soluble resin may be, for example, at least one selected from the group consisting of cellulose binders such as methylcellulose, methyl hydroxyethyl cellulose, methyl hydroxypropyl cellulose, and hydroxyethyl cellulose, starch and modified starch, gelatin and modified gelatin, natural polymer resins such as casein, pullulan, Arabic gum, karaya gum, and albumin, including derivatives thereof, polyvinyl alcohol and modified polyvinyl alcohol, latexes and emulsions such as SBR latex, NBR latex, a methyl methacrylate-butadiene copolymer, and an ethylene-vinyl acetate copolymer, polyacrylamide, vinyl polymers such as polyvinyl pyrrolidone, polyethyleneimine, polypropylene glycol, polyethylene glycol, maleic anhydride, and copolymers thereof.

A thickness of the retaining portion does not need to be uniform. For instance, a retention time of the disinfectant can be controlled by changing the thickness in part of the retaining portion. This is desirable in that the color developing time in the color developing portion can be controlled and the color developing portion can serve as an indicator indicating the time lapsed after contact with the disinfectant.

Protection Portion

In this embodiment, a protection portion for protecting the color developing portion may be disposed on the color developing portion. Here, the wording "on the color developing portion" indicates not only the case in which the protection portion is disposed in contact with the color developing portion, but also the case in which the protection portion is disposed on the retaining portion when the retaining portion is disposed on the color developing portion. For instance, when the water-soluble resin is used for the retaining portion, a surface of the retaining portion is preferably coated with a protection layer because the surface becomes viscous. The protection portion in this embodiment can be made of at least one selected from the group consisting of resins such as acrylic resin, vinyl acetate resin, vinyl chloride resin, an ethylene/vinyl acetate copolymer resin, polyamide resin, polyester resin, urethane resin, and polyolefin resin, and copolymer resins of the formers. Moreover, the protection portion is preferably configured to allow the disinfectant to permeate through the protection portion in an amount at which the visualization agent can sufficiently develop the color. The protection portion in this embodiment may include a water-resistant material for increasing water resistance. A binder being highly hydrophobic and less susceptible to hydrolysis and containing a relatively small amount of hydrophilic resin can be used as the water-resistant material. Practical examples of the water-resistant material may be acrylic resin, polycarbonate-modified urethane resin, and polyether-modified urethane resin.

The protection portion in this embodiment may further include a weather-resistant material for increasing weather resistance. Any of benzophenone, benzotriazole, triazine, and hindered amine compounds, which are ultraviolet absorbents and light stabilizers, can be used as the weather-resistant material.

The provision of the protection portion is further preferable from the viewpoint of giving durability to the color-disappearing time control portion because the surface of the disinfectant visualization sheet is wiped with the disinfectant not a few times.

Two-Dimensional Code

In the disinfectant visualization sheet according to this embodiment, the visualization agent can be disposed in the form of a two-dimensional code.

The two-dimensional code is at least one selected from the group consisting of QR code (registered trademark), micro QR code, SP code, VeriCode, MaxiCode, CP code, Data Matrix, DataMatrix ECC200, Codel, AztecCode, INTACTA CODE, Card e, Chameleon Code, PDF417, micro PDF417, Code49, Code16K, Codablock, SuperCode, Ultra Code, RSS Composite, and AztecMesa. Since the visualization agent is disposed on the base to form the two-dimensional code, it is possible to read the two-dimensional code by the above-described image capturing unit and to determine, based on image information of the read two-dimensional code, that the disinfectant has been applied.

The information regarding the time when the disinfectant has been applied and the information regarding the place where the disinfectant has been applied can be obtained from the two-dimensional code. In response to read of the two-dimensional code, character information or image information indicating the completion of the disinfection (cleaning) may be displayed on a display unit that is in, for example, the terminal having read the two-dimensional code. When the disinfected region is a place where usage fee is to be paid, such as a shop or a coworking space, the terminal may be connected to a system of paying the accompanying usage fee upon the read of the two-dimensional code. In addition, a user can be motivated to the disinfection (cleaning) by indicating, upon the read of the two-dimensional code, information regarding grant or exchange of points available in the shop, etc. and regarding giving of a discount and a gift in the form of character information, for example.

Other Examples of Disinfectant Visualization Sheet

In another example of the disinfectant visualization sheet according to this embodiment, the color developing portion may include visualization particles each including the visualization agent and a carrier particle that carries the visualization agent. An aggregate of the visualization particles can function as the color developing portion. When the visualization particles are used, positions of a retaining layer and a layer including the visualization particles can be designed in microscopic scale, and hence the disinfectant visualization sheet can be designed with precise characteristics.

Invisible Portion

In still another example of the disinfectant visualization sheet according to this embodiment, several principles can be used in a combined manner in addition the above-described visualization agent. An invisible portion may be disposed in the above-described sheet including the visualizable color developing portion. In this case, for example, a material not responsive to the visible light applied to the visualization agent is used in a combined manner. An invisible material absorbing the light of wavelength in the ultraviolet or infrared range may be disposed in the invisible portion in this embodiment. The ultraviolet or infrared range includes the near-ultraviolet or near-infrared range. The provision of the invisible portion enables the application of the disinfectant to be further confirmed from the third person perspective in addition to the visual confirmation.

In still another example of the disinfectant visualization sheet according to this embodiment, the thermochromism can also be used in a combined manner. For example, a dye developing different colors depending on temperature is additionally mixed into the visualizable color developing portion. By using such a dye, the developed color changes depending on not only whether the presence of the disinfectant, but also a change in temperature from that in the usage environment of the disinfectant. Thus, a history of the disinfectant visualization sheet, such as a finger touch to the same, can be indirectly recognized. The thermochromism dye can be selected from known substances.

Among the invisible materials used in this embodiment, the dye absorbing the light in the infrared range can be given as at least one selected from the group consisting of a phthalocyanine dye, a naphthalocyanine dye, a metal complex dye, a polymethine dye, a quinone dye, an azo dye, a diphenylmethane or triphenylmethane dye, a radical dye, a perimidine dye, and an Au nanorod. The dye absorbing the light in the ultraviolet range and emitting fluorescence can be given as at least one selected from the group consisting of merocyanine, perylene, acridine, luciferin, pyranine, stilbene, rhodamine, coumarin, and fluorescein.

Visible Wavelength Range

The visible wavelength range in this embodiment is a wavelength range of 360 nm or longer and 830 nm or shorter. The infrared wavelength range is 900 nm or longer and 14 μm or shorter, and the ultraviolet wavelength range is 100 nm or longer and 400 nm or shorter.

Marking Composition

The color developing portion disposed in the disinfectant visualization sheet according to this embodiment may be disposed as a marking indicating whether the application of the disinfectant (the cleaning) has been performed. A material used for the marking in this embodiment can be called a marking composition. The marking composition contains the above-described visualization agent and a solvent. The solvent may be, for example, a hydrophobic solvent or an aqueous solvent. The hydrophobic solvent may be, for example, an organic solvent such as heptane or petroleum ether, and the aqueous solvent may be, for example, water or alcohol.

The aqueous solvent used in this embodiment may be water or a mixed solvent using water as a main solvent and adding a protonic organic solvent or a non-protonic organic solvent. The organic solvent used in this embodiment is preferably mixed with or dissolved in water at any desired ratio and is preferably a homogeneously mixed solvent containing 50% by mass or more of water. Deionized water (ion-exchange water) or ultrapure water is preferably used as the water.

The protonic organic solvent is an organic solvent with a hydrogen atom bonded to oxygen or nitrogen (namely, an acidic hydrogen atom). The non-protonic organic solvent is an organic solvent with no acidic hydrogen atom. Examples of the organic solvent may be alcohols, alkylene glycols, polyalkylene glycols, glycol ethers, glycol ether esters, carboxylic amides, ketones, keto-alcohols, cyclic ethers, and so on.

For example, water, a water/ethanol mixed solvent, a water/ethylene glycol mixed solvent, or a water/N-methyl pyrrolidone mixed solvent may be preferably used as the aqueous solvent. The content of the water is preferably 10.0% by mass or more and 90.0% by mass or less and more preferably 50.0% by mass or more and 90.0% by mass or less on the basis of the total mass of the composition.

The content of the aqueous organic solvent in the composition is preferably 5.0% by mass or more and 90.0% by mass or less and more preferably 10.0% by mass or more and 50.0% by mass or less on the basis of the total mass of the composition.

Other Additives

The marking composition used in this embodiment may optionally contain, as required, polyalcohols such as trimethylolpropane and trimethylolethane, urine, and other water-soluble organic compounds including urine derivatives such as ethylene urine, in addition to the above-mentioned components. The marking composition used in this embodiment may further contain, as required, various additives such as a surfactant, a pH regulator, an anticorrosive agent, an antiseptic agent, a fungicide, an oxidation inhibitor, a reduction inhibitor, a vaporization accelerator, a chelating agent, and water-soluble resin. Examples of the surfactant may be anionic, cationic, and nonionic surfactants. The content of the surfactant in the marking composition is preferably 0.1% by mass or more and 5.0% by mass or less and more preferably 0.1% by mass or more and 2.0% by mass or less on the basis of the total mass of the composition. Nonionic surfactants, such as polyoxyethylene alkyl ether, polyoxyethylene aliphatic ether, polyoxyethylene alkyl phenyl ether, a polyoxyethylene polyoxypropylene block copolymer, and acetylene glycol compounds, are preferable examples of the surfactant in practical use.

When an image is recorded on a recording medium by discharging the marking composition in this embodiment from an inkjet recording head, the marking composition is preferably used under proper control of surface tension and viscosity. More specifically, a concentration of the color developing compound in the marking composition is preferably about 5% to 20%. The surface tension of the marking composition at 25° C. is preferably 10 mN/m or more and 60 mN/m or less, more preferably 20 mN/m or more and 60 mN/m or less, and particularly preferably 30 mN/m or more and 50 mN/m or less.

The viscosity of the marking composition at 25° C. is preferably 1.0 mPa·s or more and 10 mPa·s or less and more preferably 1.0 mPa·s or more and 5 mPa·s or less.

Image Recording Method (Method of Applying Marking Composition)

An image recording method in this embodiment relates to a method of applying the marking composition to the base. Various methods, for example, an inkjet method, a flexographic method, a screen method, an offset method, and a spin coating method, can be optionally used as the image recording method in this embodiment. In an example, the inkjet method is a method of recording an image on the recording medium by discharging the marking composition in this embodiment from the inkjet recording head. A method of discharging the marking composition may be a method of applying dynamic energy to the marking composition or a method of applying thermal energy to the marking composition. A process for the inkjet recording method can be implemented by a known method except for using the marking composition in this embodiment. In addition, an electrophotographic method can also be used as the image recording method.

Toner Manufacturing Method

A toner manufacturing method applicable to the electrophotographic method in this embodiment is not limited to a particular one and can be implemented as, for example, one of the following toner manufacturing methods (1) to (3).

(1) Pulverization Method

When toner is manufactured by a pulverization method, the visualization agent is first sufficiently mixed with binder resin, serving as a dispersion medium, and other additives by using a mixer such as a Henschel mixer or a ball mixer. An obtained mixture is subjected to melt kneading with a thermal kneading machine utilizing heat and a mechanical shearing force, such as a kneader or an extruder, thus making the resin and so on compatible with each other. After cooling and solidifying a material obtained with the melt kneading, the solidified material is pulverized, and pulverized particles are classified to obtain toner particles with a desired particle size.

(2) Suspension Polymerization Method

In a suspension polymerization method, a polymerizable monomer composition is obtained by homogeneously dispersing, for example, the visualization agent, a polymerizable monomer capable of forming binder resin, and other additives including a polymerization initiator, a crosslinking agent, a charge regulator, and so on as required. Then, the obtained polymerizable monomer composition is dispersed and granulated in a continuous layer (for example, an aqueous phase) containing a dispersion stabilizer by using a proper stirrer. A polymerization reaction is progressed with the polymerization initiator, and the toner particles with the desired particle size are obtained.

(3) Emulsion Aggregation Method

When toner is manufactured by an emulsion aggregation method, materials including the visualization agent, the binder resin, and other additives are first dispersed and mixed in an aqueous medium containing a dispersion stabilizer. A surfactant may be added to the aqueous medium. Then, an aggregating agent is added to progress aggregation until resin particles with the desired toner particle size is obtained. Thereafter or at the same time as the aggregation, the resin particles are fused to each other. Shape control under heating is further performed as required, whereby toner particles are formed. Then, through a filtering and washing step and a drying step, the desired toner particles are obtained.

A step of dispersing the visualization agent into the binder resin during a series of toner manufacturing steps may be performed as required. A method of dispersing the visualization agent into the binder resin may be, for example, a method of using a master batch during the toner manufacturing steps. According to that method, the visualization agent is mixed with part of the binder resin such that the visualization agent has a high concentration. An obtained mixture is subjected to melt kneading while a high shear force is applied, thus forming the master batch in which the visualization agent is finely dispersed. Then, the master batch is further subjected to melt kneading while the master batch is diluted with the remaining binder resin. A melt kneading apparatus suitably used in forming the master batch may be, for example, a kneader, a Banbury mixer, a two-roll mill, or a three-roll mill. Those apparatuses can be used solely or in combination. A melt kneading apparatus for use in the dilution kneading of the master batch may be, for example, a two-axis kneading machine.

A step of suppressing aggregation of the visualization agent during the series of toner manufacturing steps may be performed as required.

A method of suppressing the aggregation of the visualization agent during the manufacturing of the toner may be, for example, a method of performing quick cooling after a melt kneading step. In an example, a melt-kneaded material can be quickly cooled by placing the melt-kneaded material to spread in the form of a sheet on a water-cooled metal belt. The aggregation of the visualization agent caused during the cooling can be suppressed with the quick cooling. A cooling apparatus suitable for the quick cooling may be, for example, an "NR Double-Belt Cooler for High Viscosity" (made by Nippon Belting, Co., Ltd.), a "Cool-Solidifying Machine, Belt Drum Flaker" (made by NIPPON COKE & ENGINEERING, CO., LTD.), or a "Cool-Solidifying Apparatus, Drum Flaker" (made by KATSURAGI INDUSTRY, CO., LTD.).

The step of dispersing the visualization agent into the binder resin and the method of suppressing the aggregation of the visualization agent may be used in a combined manner.

Various Additives

The toner may contain, as required, one or more types of additives selected from wax, a charge regulator, an external additive, and so on. Preferably, the toner in the present disclosure does not contain a coloring component for causing a fixed image to become a visible image.

Wax

The wax is not limited to particular type, but colorless or light-colored wax is preferable. Examples of such wax are as follows.

Hydrocarbon wax, ester wax, amide wax, higher aliphatic alcohol, higher aliphatic acid, and so on. Those waxes may be used solely or in combination of plural types.

Charge Regulator

The charge regulator is not limited to a particular one, but a colorless or light-colored charge regulator is preferable. Examples of such a charge regulator are as follows.

Aromatic oxycarboxylic acid, a metal compound of aromatic oxycarboxylic acid, a boron compound, quaternary ammonium salt, calixarene, resin with a sulfonic acid (salt) group, resin with a sulfonic ester group, and so on. Those charge regulators may be used solely or in combination of plural types.

External Additive

The external additive is not limited to a particular one, but a colorless or light-colored external additive is preferable. Examples of such an external additive are as follows.

Silica, alumina, titanium oxide, strontium titanate, silicon nitride, polytetrafluoroethylene, zinc stearate, and so on. A surface of the external additive may be subjected to hydrophobic treatment.

An average particle size of primary particles forming the external additive is preferably 1/10 or less of a weight average particle size (D4) of the toner particles.

Developer

The toner can be used as a one-component developer but may be mixed with a carrier to be used as a two-component developer. A magnetic particle made of a known material, for example, a metal such as iron, ferrite, or magnetite, or an alloy of that metal and another metal, such as aluminum or lead, can be used as the carrier. The carrier may be a coated carrier that is obtained by coating a carrier surface with a coating material such as resin, or a resin-dispersed carrier that is obtained by dispersing magnetic particles into the binder resin. A volume average particle size of the carrier is preferably 15 μm or more and 100 μm or less and more preferably 25 μm or more and 80 μm or less.

Disinfectant Visualization Particle

The color developing state of a disinfectant visualization particle 405 in this embodiment changes with the application of the disinfectant. In more detail, the disinfectant visualization particle includes a color developing layer including the visualization agent of which color developing state changes with the application of the disinfectant, and a carrier particle 410 carrying the visualization agent (FIG. 4C). The disinfectant visualization particle 405 in this embodiment may include the color-disappearing time control portion (not illustrated). The color-disappearing time control portion is not always required to have a layer form. A porous particle can be used to form the color-disappearing time control portion. For example, at least one selected from the group consisting of a meso-porous silica particle, a porous silica particle, a porous titania particle, a porous zirconia particle, a porous ceria particle, a porous zinc oxide particle, a porous crosslinked methyl polymethacrylate particle, a porous crosslinked polystyrene particle, and a porous methyl methacrylate-styrene copolymer crosslinked particle. The disinfectant visualization particle including the color developing layer can be formed by impregnating the above-mentioned porous particle with a solution in which the visualization agent is dissolved, and then by drying them.

A surface of the porous particle may be treated to be hydrophilic or hydrophobic. When the disinfectant is aqueous, the particle surface is preferably hydrophilic. When the disinfectant is not aqueous, the particle surface is preferably hydrophobic.

The disinfectant visualization particle has high rigidity, and this is preferable in that the disinfectant visualization particle has high durability even when the disinfectant visualization sheet is wiped with the disinfectant not a few times.

A particle size of the disinfectant visualization particle is preferably 30 nm or more and 5 μm or less, more preferably 50 nm or more and 3 μm or less, and particularly preferably 80 nm or more and 1 μm or less. If the particle size is smaller than 30 nm, this is undesirable because dispersion efficiency is poor and stability in storing is problematic. If the particle size is greater than 5 μm, this is undesirable because the disinfectant visualization particle tends to easily precipitate when dispersed into a solution.

Sheet Using Disinfectant Visualization Particles

The disinfectant visualization particles in this embodiment can be used in the form of a sheet including the disinfectant visualization particles by placing the disinfectant visualization particles 405 on the base 402 as illustrated in FIG. 4D.

Coating Solution of Disinfectant Visualization Particles and Coating Layer

The disinfectant visualization particles in this embodiment can be used in the form of a coating solution such as a dispersion solution or a slurry. A coating layer can be formed by applying the coating solution to an article.

Variation Example of Disinfectant Visualization Particle

The disinfectant visualization particle in this embodiment is not always required to have a particulate shape. The disinfectant visualization particle may be in the form of, for example, a rod, a plate, or a film. When the disinfectant visualization particle is in the form of a film, it is particularly desirable to dispose the color-disappearing time control portion from the viewpoint of maintaining the strength against the wiping-off of the disinfectant.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

With the system according to the present disclosure, fraud can be reduced because authentication is performed by using the information regarding the concentration distributions in the encoding region before and after the application of the external stimulus.

While the present disclosure has been described with reference to exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-033444, which was filed on Mar. 4, 2022 and Japanese Patent Application No. 2023-015334, which was filed on Feb. 3, 2023, both of which are hereby incorporated by reference herein in their entirety.

What is claimed is:

1. An authentication system using an information encoding article that includes an information code, the authentication system comprising:

an optical change detection device capable of reading the information code;

at least one memory storing a program; and at least one processor that executes the stored program, which causes the at least one processor to:

acquire first information regarding a change in a concentration distribution in an encoding region due to application of an external stimulus; and execute authentication by using at least both second information acquired prior to the first information and regarding the concentration distribution in the encoding region and the first information, wherein the information encoding article having the encoding region where the information code is formed, the concentration distribution in the encoding region, to be read by the optical change detection device, changing upon application of the external stimulus to the encoding region.

2. The authentication system according to claim 1, wherein the at least one processor further executes the authentication based on a degree of correlation between the first information and the second information.

3. The authentication system according to claim 1, wherein the first information and the second information are each a time-dependent change in the concentration distribution in the encoding region.

4. The authentication system according to claim 1, wherein the first information and the second information are each information regarding a spatial concentration distribution in the encoding region.

5. The authentication system according to claim 1, wherein the external stimulus is application of a disinfectant.

* * * * *